US009878844B2

United States Patent
Schneider

(10) Patent No.: US 9,878,844 B2
(45) Date of Patent: Jan. 30, 2018

(54) COLLAPSIBLE DRIVE-ON CONTAINMENT BASIN

(71) Applicant: Steve Schneider, Decatur, GA (US)

(72) Inventor: Steve Schneider, Decatur, GA (US)

( * ) Notice: Subject to any disclaimer, the term of this patent is extended or adjusted under 35 U.S.C. 154(b) by 0 days.

(21) Appl. No.: 15/176,913

(22) Filed: Jun. 8, 2016

(65) Prior Publication Data

US 2017/0022001 A1 Jan. 26, 2017

Related U.S. Application Data

(60) Provisional application No. 62/172,323, filed on Jun. 8, 2015.

(51) Int. Cl.
*B65D 90/24* (2006.01)
*F16N 31/00* (2006.01)

(52) U.S. Cl.
CPC ............ *B65D 90/24* (2013.01); *F16N 31/006* (2013.01)

(58) Field of Classification Search
CPC ...... B65D 81/261; B65D 90/24; B65D 90/22; B65D 11/1853; B65D 11/1833; B65D 11/18; E04H 6/428; F16N 31/006; F16N 31/002; F16N 31/00
USPC ..... 220/6, 4.01, 573, 571, 9.1–9.4; 184/106; 180/69.1
See application file for complete search history.

(56) References Cited

U.S. PATENT DOCUMENTS

| | | | | |
|---|---|---|---|---|
| 935,278 | A * | 9/1909 | Smyth .................... | B65D 7/48 220/573 |
| 4,801,005 | A * | 1/1989 | Hahn .................... | F16N 31/006 141/86 |
| 5,020,638 | A * | 6/1991 | Smith ................... | F16N 31/006 184/1.5 |
| 5,316,175 | A * | 5/1994 | Van Romer .......... | F16N 31/006 220/4.12 |
| 5,511,683 | A * | 4/1996 | Dailey ................... | B08B 17/00 220/573 |
| 5,711,402 | A * | 1/1998 | Sumpter, Sr. ......... | F16N 31/006 141/98 |
| 2012/0312821 | A1* | 12/2012 | Matson .................. | F16N 31/00 220/573 |
| 2014/0030022 | A1* | 1/2014 | Nicholas ............... | B65D 90/24 405/52 |

* cited by examiner

*Primary Examiner* — Robert J Hicks
(74) *Attorney, Agent, or Firm* — Thomas | Horstemeyer, LLP

(57) ABSTRACT

A collapsible drive-on containment basin configured to retain a collection of hazardous materials is presented. In one embodiment, the collapsible drive-on containment basin includes a non-porous liner that comprises a plurality of fastening mechanisms and a plurality of elongated barriers. Initially, the containment basin may be in a collapsed state and later expanded as part of an effort to prevent the spread of hazardous materials at a job site, particularly to prevent the spread of hazardous materials coming from vehicles and machinery. Once in an expanded state, operators can drive vehicles on and off the collapsible drive-on containment basin. Thus, the collapsible drive-on containment basin reduces the amount of time spent preparing a job location against the potential spread of hazardous materials.

20 Claims, 3 Drawing Sheets

COLLAPSIBLE DRIVE-ON CONTAINMENT BASIN

CROSS REFERENCE TO RELATED APPLICATIONS

This application claims the benefit of, and priority to, U.S. Provisional Patent Application No. 62/172,323, entitled "Collapsible Drive-On Containment Basin," and filed on Jun. 8, 2015, the entire contents of which is hereby incorporated herein by reference.

BACKGROUND

Environmental containers may be used to contain hazardous materials at various job locations, such as at maintenance shops, field locations, drilling sites for oil and gas wells, manufacturing facilities, warehouses, user facilities, etc. In this context, environmental containers may be brought to the job location to prevent the spread of contaminants, such as spilled oil or gas, in the environment. Potential sources of hazardous spills may be vehicles, trucks, tankers, frac tanks, and other equipment used at a job location.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to a collapsible drive-on containment basin that may be used to retain hazardous materials. Work crews may use several vehicles and pieces of equipment that handle hazardous materials at various job locations, such as at maintenance shops, field locations, drilling sites for oil and gas wells, manufacturing facilities, warehouses, user facilities, etc. Spills of hazardous materials may occur due to improper handling of materials, equipment malfunctions, vehicle malfunctions, vehicle leaks, or operator errors.

An operator may prepare the job location by setting up environmental containment items. These environmental containment items may be arranged to catch potential leaks that may occur while the operator is performing his or her job responsibilities. In some scenarios, setting up environmental containment items to catch spills from large vehicles and equipment may call for several containment items to be used to cover the area under a large truck or piece of equipment. An operator may arrange the multiple environmental containment items in such a way to ensure there are no gaps for spills to fall between. It may take a relatively long period of time to prepare a job location in this manner. However, described herein is an environmental drive-on containment basin that provides a solution that may reduce the amount of time spent protecting a job location against potential hazardous spills from vehicles and machinery.

Figure 1:
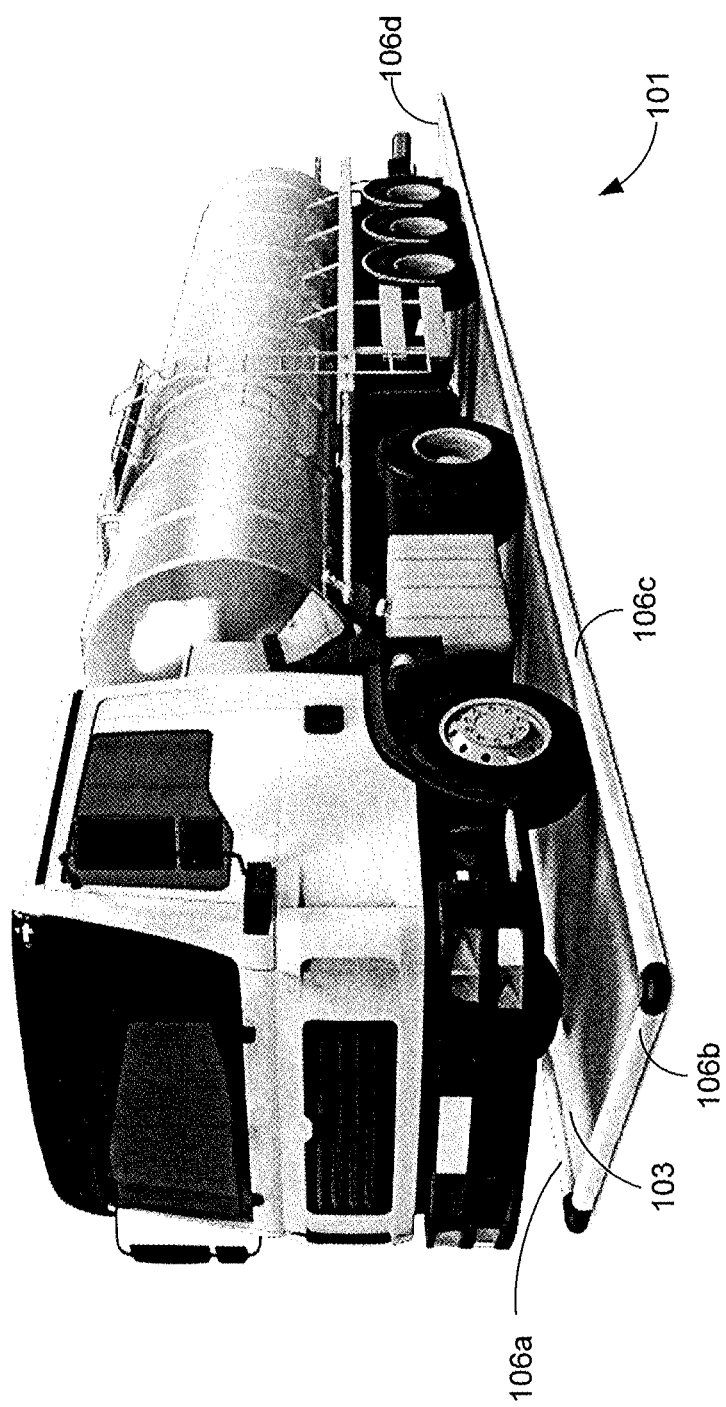
FIG. 1 illustrates an example of a collapsible drive-on containment basin according to various embodiments of the present disclosure.

With reference to FIG. 1, shown is an example of a collapsible drive-on containment basin 101 according to various embodiments of the present disclosure. According to the embodiment shown in FIG. 1, the collapsible drive-on containment basin 101 comprises a non-porous liner 103, a first elongated barrier 106a, a second elongated barrier 106b, a third elongated barrier 106c, and a fourth elongated barrier 106d (collectively "the elongated barriers 106").

The non-porous liner 103 is configured to collect and retain hazardous materials, such as various types of fuel, chemicals, and hydrocarbons. The non-porous liner 103 may be configured in numerous shapes and comprised of various materials. A rectangular shape may be used to provide containment of spills caused by vehicles brought to a job location. Alternatively, the non-porous liner 103 may be configured in a square shape to provide containment of spills caused by various types of machinery. In some embodiments, the non-porous liner 103 comprises a desiccant pad and a polyethylene bottom layer. In addition, the non-porous liner 103 may comprise a plurality of fastening mechanisms, such as tie-offs and hook and loop fasteners. The fastening mechanisms may be connected along the edges of the non-porous liner 103. Each of the fastening mechanisms may be used to connect one of the elongated barriers 106 to an edge of the non-porous liner 103. For example, in some embodiments, multiple fastening mechanisms may be used to connect four elongated barriers 106 along the edges of a rectangular non-porous liner 103.

The elongated barriers 106 are configured to assist in the retention of hazardous materials on the non-porous liner 103 by serving as a barrier along the edges by forming a retention barrier. The elongated barriers 106 may be configured in numerous shapes and may be comprised of a pliable material. In some embodiments, an elongated barrier 106 may be manufactured in a cylindrical shape and composed of a foam material. In other embodiments, the elongated barrier 106 may require some assembly before the elongated barrier 106 can be secured to the non-porous liner 103. For example, the elongated barrier 106 may include multiple rod-shaped parts that may be connected to form a longer barrier. Alternatively, the elongated barrier 106 may be comprised of a malleable material that is initially in a compressed state, and the elongated barrier 106 may be expanded by folding the parts of the elongated barrier 106 until it is fully expanded. In some embodiments, the elongated barrier 106 may not require any assembly.

Next, a description of the operation of the various components of the collapsible drive-on containment basin 101 is provided. As described above, before an operator may begin working, a job site may be prepared to prevent the spread of hazardous materials into the environment. In this context, potential sources of hazardous spills may be vehicles, trucks, tankers, frac tanks, and equipment. A collapsible drive-on containment basin 101 may be transported to the job site in a collapsed state. After arriving at the job site, the collapsible drive-on containment basin 101 may be deployed by removing the various components from a traveling bag. The various components may be initially in a collapsed state.

The non-porous liner 103 may be unfolded by pivoting a portion of the non-porous liner 103 away from another portion of the non-porous liner 103. This action may be repeated until the non-porous liner 103 has reached an expanded state in the shape of a rectangle. Next, each of the four elongated barriers 106 may individually be assembled by aligning shorter components and connecting them to each. Thereafter, the four elongated barriers 106 may be connected to the non-porous liner 103 via the fastening mechanisms. In one embodiment, tie-offs may be used to secure one elongated barrier 106 to each of the four edges of the non-porous liner 103. Then, the four elongated barriers 106 may be connected to each other. At this point, an operator may drive a truck over one of the elongated barriers 106 of the collapsible drive-on containment basin 101. The operator will stop the truck once the entire area of ground underneath the vehicle is covered by the collapsible drive-on containment basin 101.

Now, any liquid spills or leaks occurring underneath the vehicle will be captured by the collapsible drive-on containment basin 101. Likewise, the collapsible drive-on containment basin 101 will collect any spillage occurring as a result of machinery operating on the truck. After a job assignment is complete, the operator may drive the truck over one of the elongated barriers 106 to exit the collapsible drive-on containment basin 101. The operator may reverse the steps discussed above to collapse the collapsible drive-on containment basin 101.

Figure 2:
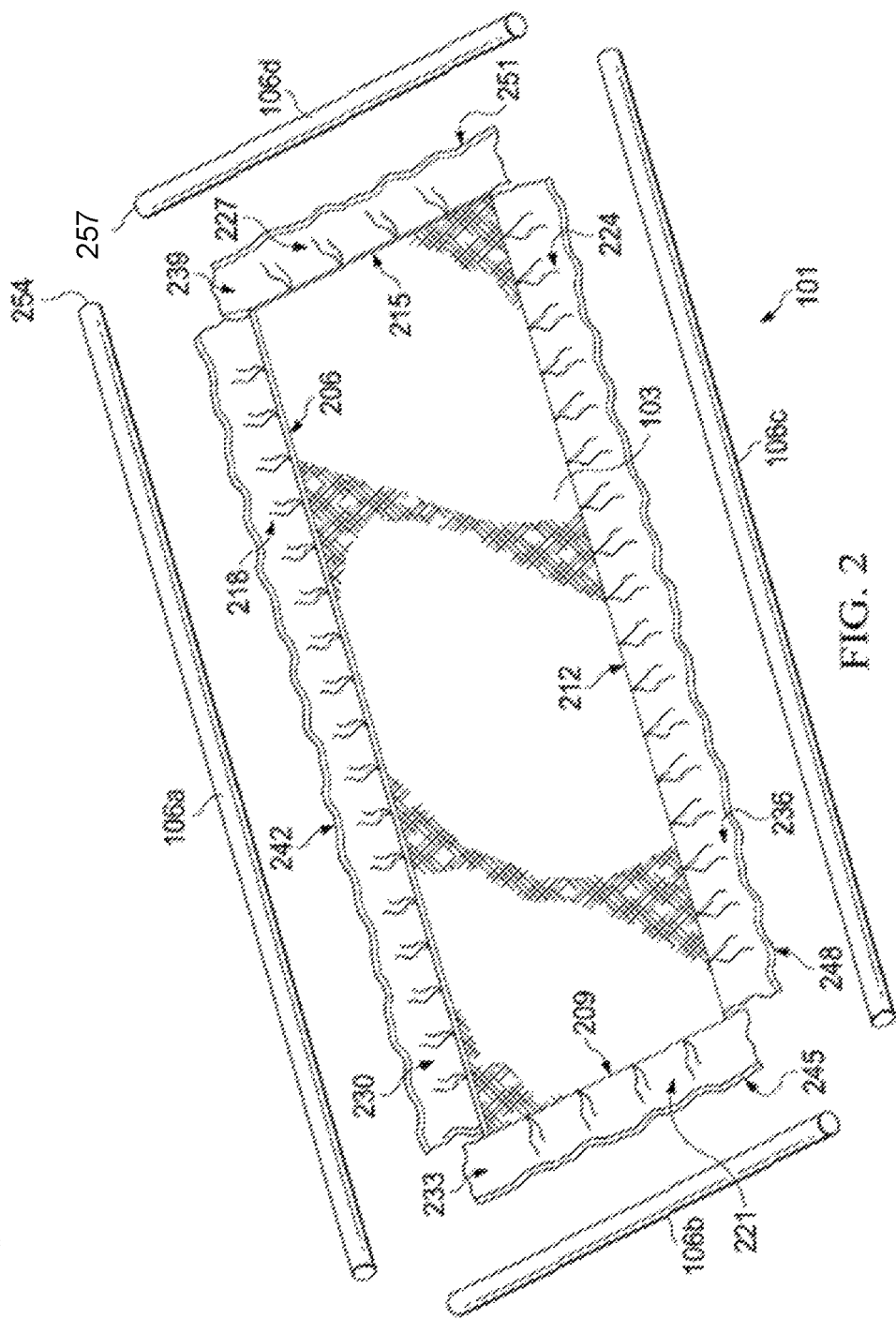
FIG. 2 illustrates an example of the collapsible drive-one containment basin shown in FIG. 1 in an unassembled state according to various embodiments of the present disclosure.

With reference to FIG. 2, shown is an example of the collapsible drive-one containment basin shown in FIG. 1 in an unassembled state. In particular, FIG. 2 illustrates the various components of the collapsible drive-on containment basin 101 for one embodiment, among others. According to the embodiment shown in FIG. 2, the collapsible drive-on containment basin 101 includes the non-porous liner 103, the first elongated barrier 106a, the second elongated barrier 106b, the third elongated barrier 106c, and the fourth elongated barrier 106d.

The non-porous liner 103 may comprise a first end, a second end, a third end, and a fourth end. The non-porous liner 103 may also include a first hook-and-loop fastener strip 206, such as a Velcro® strip, attached to the first end, a second hook-and-loop fastener strip 209, such as a Velcro® strip, attached to the second end, a third hook-and-loop fastener strip 212, such as a Velcro® strip, attached to the third end, and a fourth hook-and-loop fastener strip 215, such as a Velcro® strip, attached to the fourth end.

In addition, the non-porous liner 103 may include a first set of tie-offs 218 attached to the first end, a second set of tie-offs 221 attached to the second end, a third set of tie-offs 224 attached to the third end, and a fourth set of tie-offs 227 attached to the fourth end. The non-porous liner 103 may also include a first closable flap 230 attached to the first end, a second closable flap 233 attached to the second end, a third closable flap 236 attached to the third end, a fourth closable flap 239 attached to the fourth end.

The first closable flap 230 comprises a first inside hook-and-loop fastener strip 242, such as a Velcro® strip. The second closable flap 233 comprises a second inside hook-and-loop fastener strip 245, such as a Velcro® strip. The third closable flap 236 comprises a third inside hook-and-loop fastener strip 248, such as a Velcro® strip, and the fourth closable flap 239 comprises a fourth inside hook-and-loop fastener strip 251, such as a Velcro® strip.

Next, a description of the operation of the various components of the collapsible drive-on containment basin 101 is provided. To begin, the collapsible drive-on containment basin 101 can be assembled by positioning the first elongated barrier 106a along the first end of the non-porous liner 103. In turn, the first elongated barrier 106a will be positioned next to the first hook-and-loop fastener strip 206. The first elongated barrier 106a can be attached to the first end of the non-porous liner 103 using the first set of tie-offs 218. The first closable flap 230 can be wrapped around a portion of the first elongated barrier 106a. The first closable flap 230 can be attached to the first end of the non-porous liner 103. In one embodiment, among others, the first closable flap 230 is attached by joining the first inside hook-and-loop fastener strip 242 to the first hook-and-loop fastener strip 206 of the non-porous liner 103. As one skilled in the art can appreciate, the second elongated barrier 106b, the third elongated barrier 106c, and the fourth elongated barrier 106d can be attached to the non-porous liner 103 in a similar manner as described above with respect to the first elongated barrier 106a.

In some embodiments, the elongated barriers 106 are attached to each other to form a square or rectangular shape. For example, each of the elongate barriers 106 may comprise a first end with a male connector and a second end with a female connector. The female connector 254 of the first elongated barrier 106a may be connected to the male connector 257 of the fourth elongated barrier 106d. In this non-limiting example, the elongated barriers 106 may be comprised of a pliable material. Thus, each of the elongated barriers 106 can be bent at the ends to connect with another elongated barrier 106 while also attached to the non-porous liner 103. When attached to each other, the elongated barriers 106 form a retainer barrier for liquids, solids, and other materials.

Figure 3:
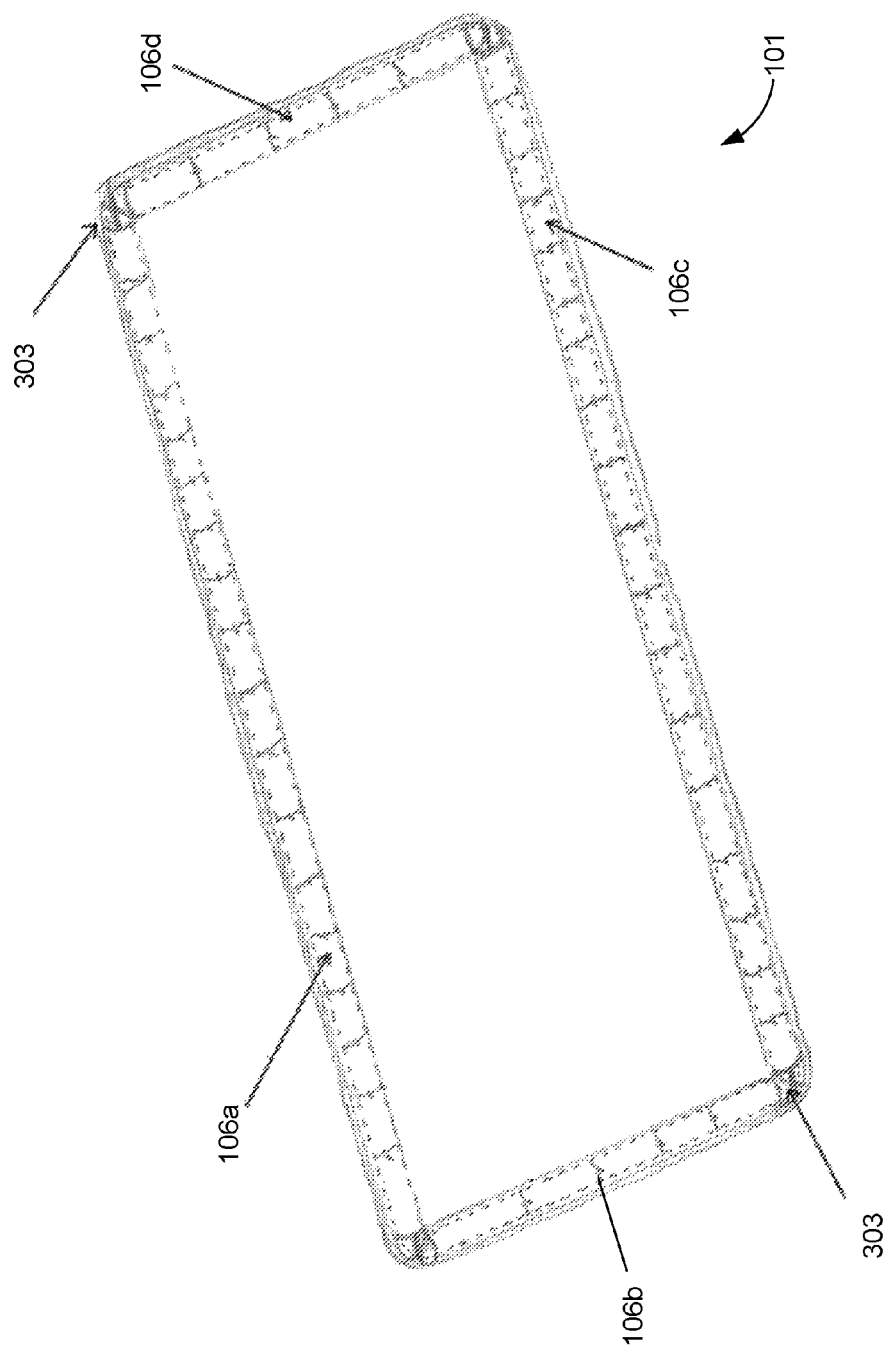
FIG. 3 illustrates an example of the collapsible drive-one containment basin shown in FIG. 1 in an assembled state according to various embodiments of the present disclosure.

Turning to FIG. 3, shown is an example of the collapsible drive-one containment basin shown in FIG. 1 in a fully assembled state. Specifically, the illustrated embodiment shows each of the elongated barriers 106 inside of a respective closable flap. FIG. 3 also illustrates the first elongated barrier 106a connected to the second elongated barrier 106b and the second elongated barrier 106b connected to the third elongated barrier 106c. The third elongated barrier 106c is connected to the fourth elongated barrier 106d. The elongated barriers 106 are connected to each by bending the ends and inserting one into the other. For example, one end of the first elongated barrier 106a can be inserted into another end of the second elongated barrier 106b. The connection of the two elongated barriers 106 forms a corner connection. In the illustrated embodiment, the corner connection is attached to the non-porous liner 103 via a corner hook-and-loop fastener strip 303, such as a Velcro® strip.

The above-described embodiments of the present disclosure are merely possible examples of implementations to set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A collapsible container, comprising:
   a first elongated barrier, a second elongated barrier, a third elongated barrier, and a fourth elongated barrier;
   a non-porous liner that comprises a first end, a second end, a third end, and a fourth end, the first end comprising a fastener;
   a first closable flap that comprises a first end and a second end, wherein the first end of the first closable flap attaches to the first end of the non-porous liner, wherein the first closable flap wraps around at least a portion of the first elongated barrier and attaches the first elongated barrier to the non-porous liner, wherein the second end of the first closable flap attaches to the first end of the non-porous liner via the fastener;
   a second closable flap attached to the second end of the non-porous liner, wherein the second closable flap wraps around at least a portion of the second elongated barrier and attaches the second elongated barrier to the non-porous liner;
   a third closable flap attached to the third end of the non-porous liner, wherein the third closable flap wraps around at least a portion of the third elongated barrier and attaches the third elongated barrier to the non-porous liner; and
   a fourth closeable flap attached to the fourth end of the non-porous liner, wherein the fourth closable flap wraps around at least a portion of the fourth elongated barrier and attaches the fourth elongated barrier to the non-porous liner.

2. The collapsible container of claim 1, wherein at least one of the first elongated barrier, the second elongated barrier, the third elongated barrier, and the fourth elongated barrier is attached to the non-porous liner via at least one of a tie-off, a hook and loop fastener, or a buckle and fastener.

3. The collapsible container of claim 1, wherein at least one of the first elongated barrier, the second elongated barrier, the third elongated barrier, and the fourth elongated barrier is comprised of a pliable material.

4. The collapsible container of claim 1, wherein the first elongated barrier and the second elongated barrier comprise a first end with a male connector and a second end with a female connector, wherein the male connector is integrally attached to the first end of the first elongated barrier and the second elongated barrier, wherein the female connecter is integrally attached to the second end of the first elongated barrier and the second elongated barrier.

5. The collapsible container of claim 4, wherein the male connector of the first elongated barrier is connected with the female connector of the second elongated barrier to form a corner connection.

6. The collapsible container of claim 1, wherein at least one of the first closable flap, the second closable flap, the third closable flap, and the fourth closable flap is attached via a Velcro® strip.

7. A container apparatus, comprising:
   a first elongated barrier, a second elongated barrier, a third elongated barrier, and a fourth elongated barrier;
   a non-porous liner that comprises a first end, a second end, a third end, and a fourth end, the first end comprising a fastener;
   a first closable flap that comprises a first end and a second end, wherein the first end of the first closable flap attaches to the first end of the non-porous liner, wherein the first closable flap wraps around at least a portion of the first elongated barrier and attaches the first elongated barrier to the non-porous liner, wherein the second end of the first closable flap attaches to the first end of the non-porous liner via the fastener;
   a second closable flap attached to the second end of the non-porous liner, wherein the second closable flap wraps around at least a portion of the second elongated barrier and attaches the second elongated barrier to the non-porous liner;
   a third closable flap attached to the third end of the non-porous liner, wherein the third closable flap wraps around at least a portion of the third elongated barrier and attaches the third elongated barrier to the non-porous liner; and
   a fourth closeable flap attached to the fourth end of the non-porous liner, wherein the fourth closable flap wraps around at least a portion of the fourth elongated barrier and attaches the fourth elongated barrier to the non-porous liner.

8. The container apparatus of claim 7, wherein at least one of the first elongated barrier, the second elongated barrier, the third elongated barrier, and the fourth elongated barrier is comprised of a malleable material.

9. The container apparatus of claim 8, wherein at least one of the first elongated barrier, the second elongated barrier, the third elongated barrier, and the fourth elongated barrier is attached to the non-porous liner via a tie-off.

10. The container apparatus of claim 8, wherein the at least one of the first elongated barrier, the second elongated barrier, the third elongated barrier, and the fourth elongated barrier can be configured in a compressed state and an expanded state.

11. The container apparatus of claim 7, wherein the first elongated barrier and the second elongated barrier comprise a first end with a male connector and a second end with a female connector.

12. The container apparatus of claim 11, wherein the male connector of the first elongated barrier is connected with the female connector of the second elongated barrier to form a corner of a retention barrier.

13. The container apparatus of claim 11, wherein the corner is attached to the non-porous liner via a Velcro® strip.

14. The container apparatus of claim 7, wherein at least one of the first elongated barrier, the second elongated barrier, the third elongated barrier, and the fourth elongated barrier is attached to the non-porous liner via a buckle and fastener.

15. The container apparatus of claim 7, wherein at least one of the first elongated barrier, the second elongated barrier, the third elongated barrier, and the fourth elongated barrier is a flexible pipe.

16. A collapsible container, comprising:
   a first pipe, a second pipe, a third pipe, and a fourth pipe;
   a non-porous liner that comprises a first end, a second end, a third end, and a fourth end, the first end comprising a fastener;
   a first closable flap that comprises a first end and a second end, wherein the first end of the first closable flap attaches to the first end of the non-porous liner, wherein the first closable flap wraps around at least a portion of the first pipe and attaches the first pipe to the non-porous liner, wherein the second end of the first closable flap attaches to the first end of the non-porous liner via the fastener;
- a second closable flap attached to the second end of the non-porous liner, wherein the second closable flap wraps around at least a portion of the second pipe and attaches the second pipe to the non-porous liner;
- a third closable flap attached to the third end of the non-porous liner, wherein the third closable flap wraps around at least a portion of the third pipe and attaches the third pipe to the non-porous liner; and
- a fourth closeable flap attached to the fourth end of the non-porous liner, wherein the fourth closable flap wraps around at least a portion of the fourth pipe and attaches the fourth pipe to the non-porous liner.

17. The collapsible container of claim 16, wherein at least one of the first pipe, the second pipe, the third pipe, and the fourth pipe is comprised of a pliable material.

18. The collapsible container of claim 17, wherein the first pipe is connected to the second pipe, wherein the second pipe is connected to the third pipe, wherein the third pipe is connected to the fourth pipe, and wherein the fourth pipe is connected to the first pipe.

19. The collapsible container of claim 16, wherein the first closable flap wraps around at least the portion of the first pipe and attaches the first pipe to the non-porous liner via a hook and loop fastener strip.

20. The collapsible container of claim 16, wherein the first closable flap wraps around at least the portion of the first pipe and attaches the first pipe to the non-porous liner via a buckle and fastener.

\* \* \* \* \*